G. C. JOHNSON.
LUBRICATOR.
No. 182,675.  Patented Sept. 26, 1876.
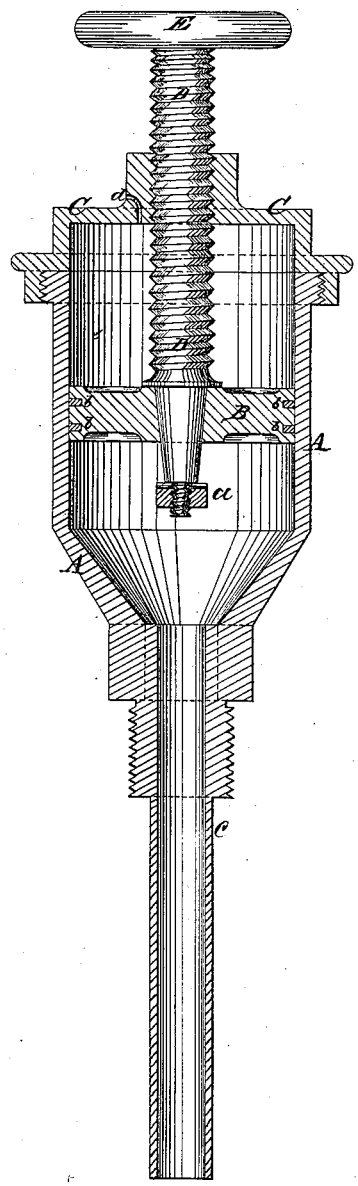
WITNESSES:
H. Rydquist.
John Goethals
INVENTOR:
G. C. Johnson
BY Munn & Co
ATTORNEYS.

UNITED STATES PATENT OFFICE.

GEORGE C. JOHNSON, OF PORTLAND, MAINE, ASSIGNOR TO HIMSELF AND LEONARD CROCKETT, OF SAME PLACE.

IMPROVEMENT IN LUBRICATORS.

Specification forming part of Letters Patent No. 182,675, dated September 26, 1876; application filed August 14, 1876.

*To all whom it may concern:*

Be it known that I, GEORGE C. JOHNSON, of Portland, in the county of Cumberland and State of Maine, have invented a new and Improved Lubricator, of which the following is a specification:

My invention relates to lubricators for journals.

The object of my invention is to provide a lubricator for forcing dense lubricating compound into journal-boxes.

Referring to the drawing, A is a cylinder, of brass or other suitable material, and truly bored to receive the piston B. A cap, C, is screwed onto the top of the cylinder A, and D is a screw provided with the hand-wheel E, and fitting a screw-thread cut in the center of the cap. The lower end of the screw is made conical, to fit a conical seat in the center of the piston.

The conical part of the screw is longer than the thickness of the piston, and projects a short distance below the piston, and is provided with a nut and washer, *a*, to prevent the piston from leaving it. Grooves *b* are cut in the piston to receive packing-rings.

The lower end of the cylinder A is made conical or funnel-shaped, and is provided with a threaded tube, *c*, which screws into the journal-box. An aperture, *d*, is made in the cap for the admission of air.

This lubricator is intended for forcing lubricating compounds, that are too dense to flow by their own gravity, into journal-boxes.

The cylinder A is filled with the lubricant by removing the cap and piston. The lubricant is forced into the journal-box, through the tube *c*, by forcing down the piston, by means of the screw.

Should the journal heat, the lubricator becomes warm, melting the lubricant, allowing the piston to drop to the nut *a*, leaving a space between it and the conical part of the screw, through which air may pass.

The lubricator is tightly covered, excluding dust. The use of a dense lubricant prevents the worn grease and dirt from rising from the journal into the lubricator.

By using my invention and the proper compound, lubrication can be accomplished more perfectly and more economically than by other means now in use.

Having thus described my invention, I claim as new and desire to secure by Letters Patent—

1. The screw D of a lubricator, provided with a conical end that extends through piston, and some distance beyond it, being end-threaded, and having end nut, for the purpose specified.

2. The combination of the cylinder A, piston B, having a central conical seat, the screw D, having the conical end, the cap C, and tube *c*, substantially as shown and described.

GEORGE C. JOHNSON.

Witnesses:
C. SEDGWICK,
GEO. M. HOPKINS.